United States Patent
Nayak et al.

(10) Patent No.: US 10,564,616 B2
(45) Date of Patent: Feb. 18, 2020

(54) BUILDING MANAGEMENT SYSTEM WITH AUTOMATIC POINT MAPPING VALIDATION

(71) Applicant: Johnson Controls Technology Company, Auburn Hills, MI (US)

(72) Inventors: Rajesh C. Nayak, Vidyaratna Nagar Manipal (IN); Abhigyan Chatterjee, Asansol District-Burdwan (IN); Barkha Shah, Mumbai (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 1 day.

(21) Appl. No.: 16/052,038

(22) Filed: Aug. 1, 2018

(65) Prior Publication Data

US 2019/0146429 A1    May 16, 2019

(30) Foreign Application Priority Data

Nov. 15, 2017 (IN) .............................. 201741040785

(51) Int. Cl.
   *G05B 15/02* (2006.01)
   *F24F 11/64* (2018.01)
   (Continued)

(52) U.S. Cl.
   CPC ........... *G05B 15/02* (2013.01); *G06F 3/0486* (2013.01); *G06F 3/04847* (2013.01);
   (Continued)

(58) Field of Classification Search
   None
   See application file for complete search history.

(56) References Cited

U.S. PATENT DOCUMENTS 6,088,659 A * 7/2000 Kelley .................. G01D 4/004
                                                    702/62
9,217,994 B2 * 12/2015 Ainsley .................. G05B 15/02
                          (Continued)

FOREIGN PATENT DOCUMENTS

WO    WO 2017/127373        7/2017

OTHER PUBLICATIONS

U.S. Appl. No. 15/821,142, filed Nov. 22, 2017, Johnson Controls Technology Company.
(Continued)

*Primary Examiner* — Ramesh B Patel
(74) *Attorney, Agent, or Firm* — Foley & Lardner LLP

(57) ABSTRACT

A building management system includes at least one of a meter or equipment configured to provide data samples for a point and a point mapping system configured to store a point object corresponding to the point and including a unit attribute, store a template object corresponding to a building equipment metric and including an allowed units attribute, access the point object to read the unit attribute, access the template object to read the allowed units attribute, in response to a request to map the point object to the template object, determine whether the unit attribute matches the allowed units attribute, and, in response to a determination that the unit attribute matches the allowed units attribute, automatically map the point object to the template object. The building management system also includes a system manager configured to calculate the building equipment metric using the samples for the point and operate building equipment using the building equipment metric.

20 Claims, 8 Drawing Sheets

(51) Int. Cl.
*F24F 11/65* (2018.01)
*G06F 3/0482* (2013.01)
*G06F 3/0486* (2013.01)
*G06F 3/0484* (2013.01)

(52) U.S. Cl.
CPC .............. *F24F 11/64* (2018.01); *F24F 11/65* (2018.01); *G06F 3/0482* (2013.01)

(56) References Cited

U.S. PATENT DOCUMENTS

| | | | | |
|---|---|---|---|---|
| 2006/0265489 | A1* | 11/2006 | Moore | H04L 67/1095 709/223 |
| 2013/0184887 | A1* | 7/2013 | Ainsley | G05B 15/02 700/291 |
| 2017/0212482 | A1* | 7/2017 | Boettcher | G05B 15/02 |
| 2017/0212668 | A1* | 7/2017 | Shah | G06F 3/04847 |
| 2017/0357225 | A1 | 12/2017 | Asp et al. | |
| 2017/0357490 | A1 | 12/2017 | Park et al. | |
| 2018/0232422 | A1 | 8/2018 | Park et al. | |
| 2018/0232423 | A1 | 8/2018 | Park et al. | |
| 2018/0232459 | A1 | 8/2018 | Park et al. | |
| 2018/0284736 | A1* | 10/2018 | Cella | G05B 23/024 |
| 2018/0375678 | A1* | 12/2018 | Lapsley | H04L 12/281 |
| 2018/0375679 | A1* | 12/2018 | Lapsley | H04L 12/282 |

OTHER PUBLICATIONS

U.S. Appl. No. 15/821,472, filed Nov. 22, 2017, Johnson Controls Technology Company.
U.S. Appl. No. 15/821,531, filed Nov. 22, 2017, Johnson Controls Technology Company.
U.S. Appl. No. 15/821,547, filed Nov. 22, 2017, Johnson Controls Technology Company.
U.S. Appl. No. 15/821,604, filed Nov. 22, 2017, Johnson Controls Technology Company.
U.S. Appl. No. 15/821,630, filed Nov. 22, 2017, Johnson Controls Technology Company.

* cited by examiner

BUILDING MANAGEMENT SYSTEM WITH AUTOMATIC POINT MAPPING VALIDATION

CROSS-REFERENCE TO RELATED PATENT APPLICATION

This application claims the benefit of and priority to Indian Provisional Patent Application No. 201741040785 filed Nov. 15, 2017, incorporated by reference herein in its entirety.

BACKGROUND

The present disclosure relates generally to a building management system (BMS) and more particularly to a BMS with automatic equipment/device point mapping. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

In order to provide key performance indicators to a user, a BMS may require points measured and provided by sensors in the BMS to be properly mapped to the correct building equipment devices and metrics related to those devices. Initial mapping of points to devices and metrics is typically a manual process in which a user maps points to metrics via a user interface. Mapping errors are often not discovered until metric miscalculations or error messages appear during the operational stages of the BMS.

SUMMARY

One implementation of the present disclosure is a building management system. The building management system includes at least one of a meter or equipment configured to provide data samples for a point and a point mapping system. The point mapping system is configured to store a point object corresponding to the point and including a unit attribute, store a template object corresponding to a building equipment metric and including an allowed units attribute, access the point object to read the unit attribute, access the template object to read the allowed units attribute, in response to a request to map the point object to the template object, determine whether the unit attribute matches the allowed units attribute, and, in response to a determination that the unit attribute matches the allowed units attribute, automatically map the point object to the template object. The building management system also includes a system manager configured to calculate the building equipment metric using the samples for the point in response to mapping the point object to the template object and operate building equipment using the building equipment metric to affect a variable state or condition of a building.

In some embodiments, the point mapping system is configured to prevent the mapping of the point object to the template object in response to a determination that the unit attribute does not match the allowed units attribute. In some embodiments, mapping the point object to the template object includes updating a mapping attribute of the point object to reference the template object.

In some embodiments, the building management system includes a graphical user interface generator to generate a graphical user interface that allows a user to input the request to map the point object to the template object. In some embodiments, the graphical user interface generator is configured to provide an error notification on the graphical user interface in response to a determination that the unit attribute does not match the allowed units attribute.

In some embodiments, the graphical user interface includes a points tree widget that includes a list of a plurality of points and an equipment template tree widget that includes a list of a plurality of templates. The graphical user interface allows a user to drag the point from the list of the plurality of points onto a template in the list of the plurality of templates to input the request to map the point object to the template object.

In some embodiments, the allowed units attributes identifies a plurality of allowed units and the unit attribute identifies a first unit. The point mapping validation circuit may be configured to determine whether the unit attribute matches the allowed units attribute by determining whether the plurality of allowed units comprise the first unit.

Another implementation of the present disclosure is a method for managing a building. The method includes providing, by a meter, data samples for a point, and storing, by a point mapping system, a point object corresponding to the point. The point object includes a unit attribute. The method also includes storing, by the point mapping system, a template object corresponding to a building equipment metric. The template object includes an allowed units attribute. The method also includes accessing the point object to read the unit attribute, accessing the template object to read the allowed units attribute, determining whether the unit attribute matches the allowed units attribute in response to a request to map the point object to the template object, automatically mapping the point object to the template object in response to a determination that the unit attribute matches the allowed units attribute, calculating, by a system manager, a building equipment metric using the samples for the point in response to mapping the point object to the template object, operating building equipment using the building equipment metric to affect a variable state or condition of the building.

In some embodiments, the method includes preventing, in response to a determination that the unit attribute does not match the allowed units attribute, a mapping of the storage the point object to the template object. In some embodiments, mapping the point object to the template object comprises updating a mapping attribute of the point object to reference the template object.

In some embodiments, the method includes generating a graphical user interface that allows a user to input a request to map the point object to the template object. In some embodiments, the method includes providing an error notification on the graphical user interface in response to a determination that the unit attribute does not match the allowed units attribute.

In some embodiments, the method includes providing, on the graphical user interface, a points tree widget that includes a list of a plurality of points and an equipment template tree widget that includes a list of a plurality of templates, and allowing, on the graphical user interface, a user to drag the point from the list of the plurality of points onto a template in the list of the plurality of templates to input the request to map the point object to the template object.

In some embodiments, the allowed units attribute identifies a plurality of allowed units and the unit attribute identifies a first unit. Determining whether the unit attribute matches the allowed units attribute includes determining whether the plurality of allowed units comprise the first unit.

Another implementation of the present disclosure is a building management system. The building management system includes building equipment operable to affect a variable state or condition of a building, a meter configured to provide data samples for a point, the point relating to the building equipment, and a point mapping system. The point mapping system includes a point object database configured to store a point object corresponding to the point. The point object includes a unit attribute. The point mapping system also includes a template object database configured to store a template object corresponding to a building equipment metric. The building equipment metric includes an allowed units attribute. The point mapping system also includes a point mapping validation circuit configured to receive a user request to map the point to the template, access the point object to read the unit attribute, access the template object to read the allowed units attribute, in response to the request to map the point to the template, determine whether the unit attribute matches the allowed units attribute, and in response to a determination that the unit attribute matches the allowed units attribute, automatically map the point object to the template object. The building management system also includes a system manager configured to calculate the building equipment metric using the samples for the point in response to mapping the point object to the template object and control the building equipment using the building equipment metric to affect a variable state or condition of a building.

In some embodiments, the point mapping validation circuit is further configured to, in response to a determination that the unit attribute does not match the allowed units attribute, prevent a mapping of the point object to the template object. In some embodiments, the building management system also includes a graphical user interface generator configured to generate a graphical user interface that allows a user to input the user request.

In some embodiments, the graphical user interface includes a points tree widget that includes a list of a plurality of points and an equipment template tree widget that includes a list of a plurality of templates. The graphical user interface allows a user to drag the point from the list of the plurality of points onto the template in the list of the plurality of templates to input the request to map the point object to the template object.

In some embodiments, the allowed units attribute identifies a plurality of allowed units and the unit attribute identifies a first unit. The point mapping validation circuit is configured to determine whether the unit attributed matches the allowed units attributed by determining whether the plurality of allowed units comprise the first unit.

DETAILED DESCRIPTION

Building HVAC Systems and Building Management Systems

Figure 1:
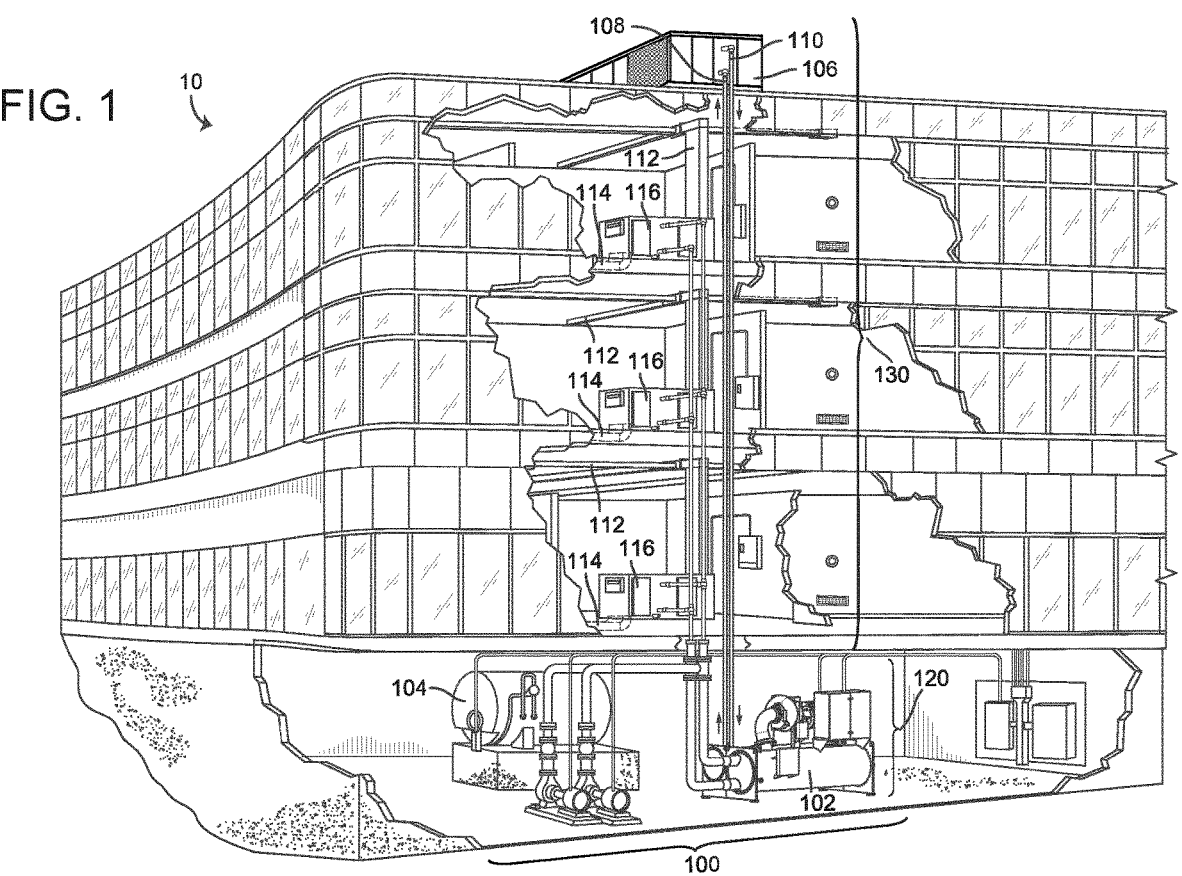
FIG. 1 is a drawing of a building equipped with a HVAC system, according to some embodiments.
Figure 2:
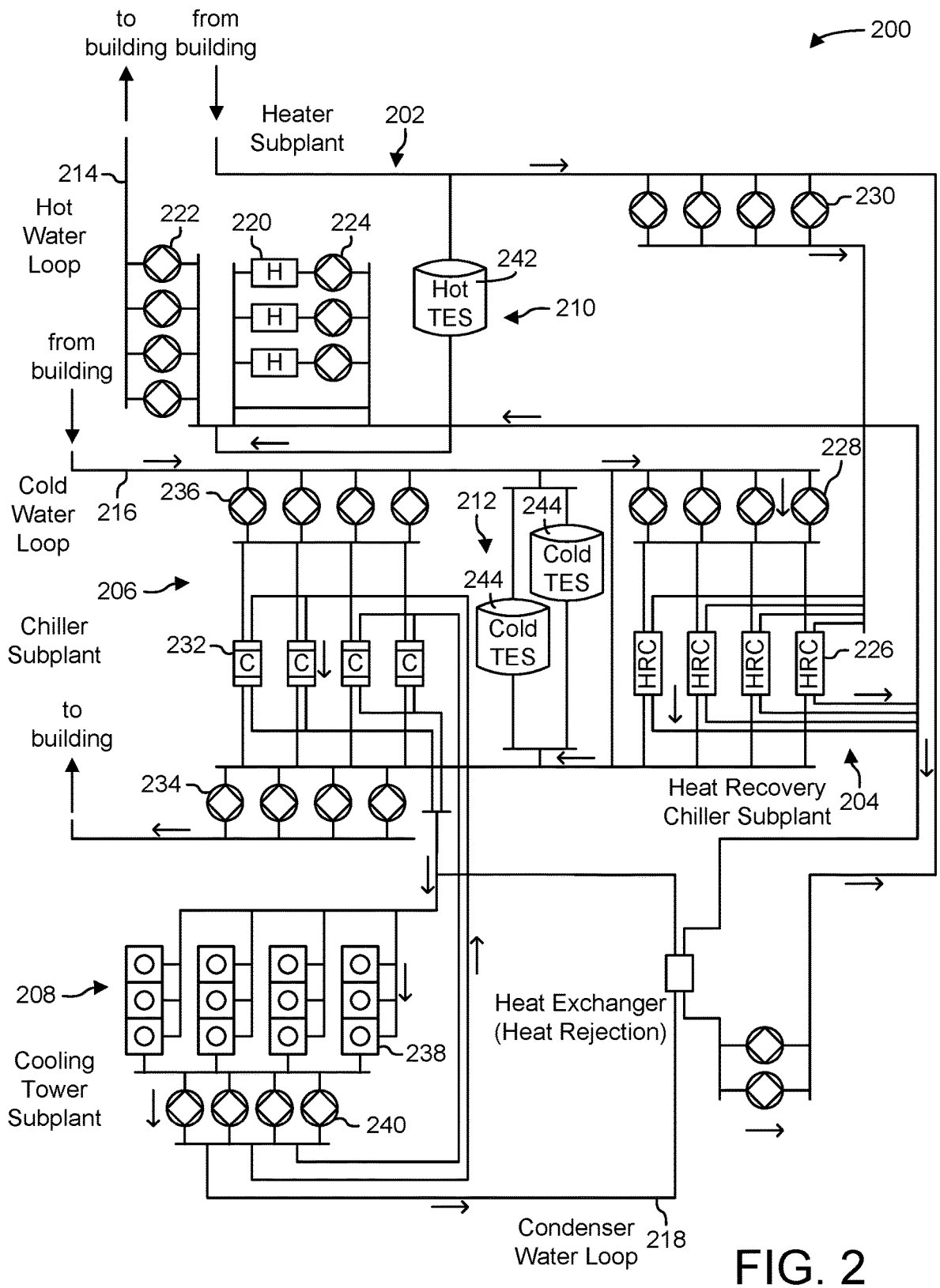
FIG. 2 is a block diagram of a waterside system which can be used to serve the building of FIG. 1, according to some embodiments.
Figure 3:
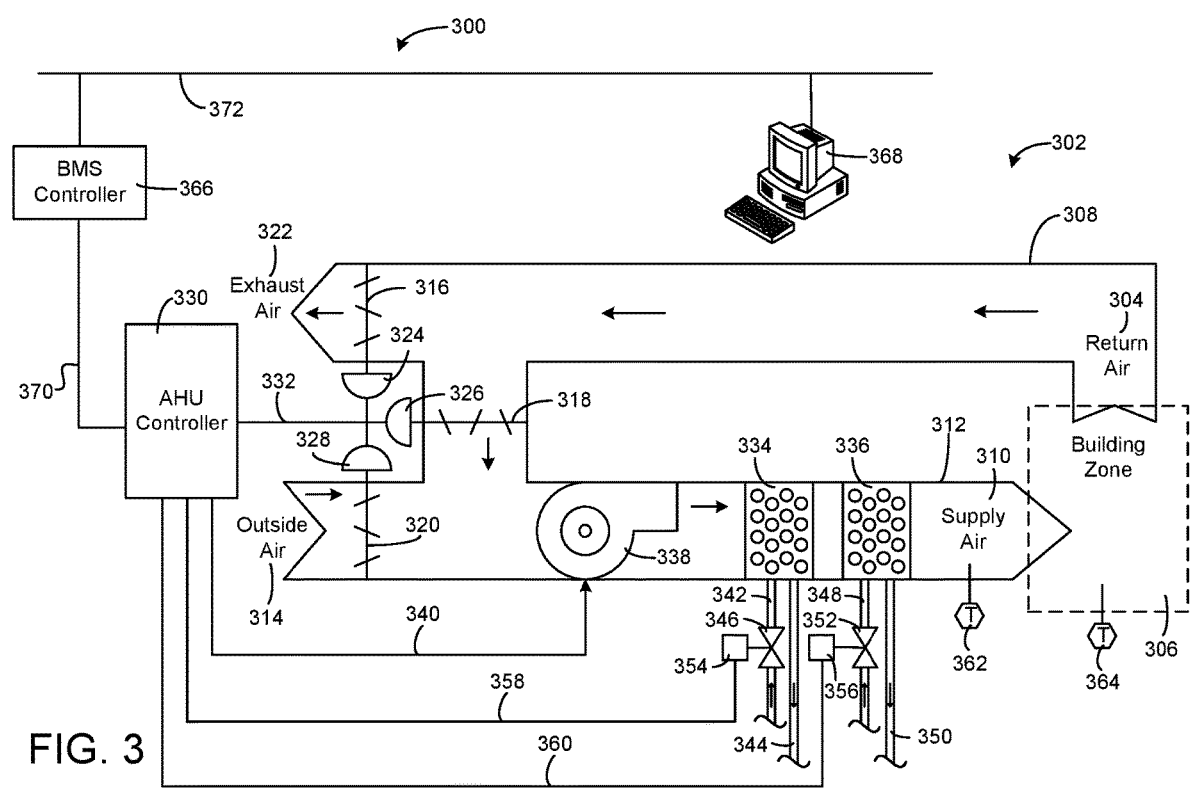
FIG. 3 is a block diagram of an airside system which can be used to serve the building of FIG. 1, according to some embodiments.
Figure 4:
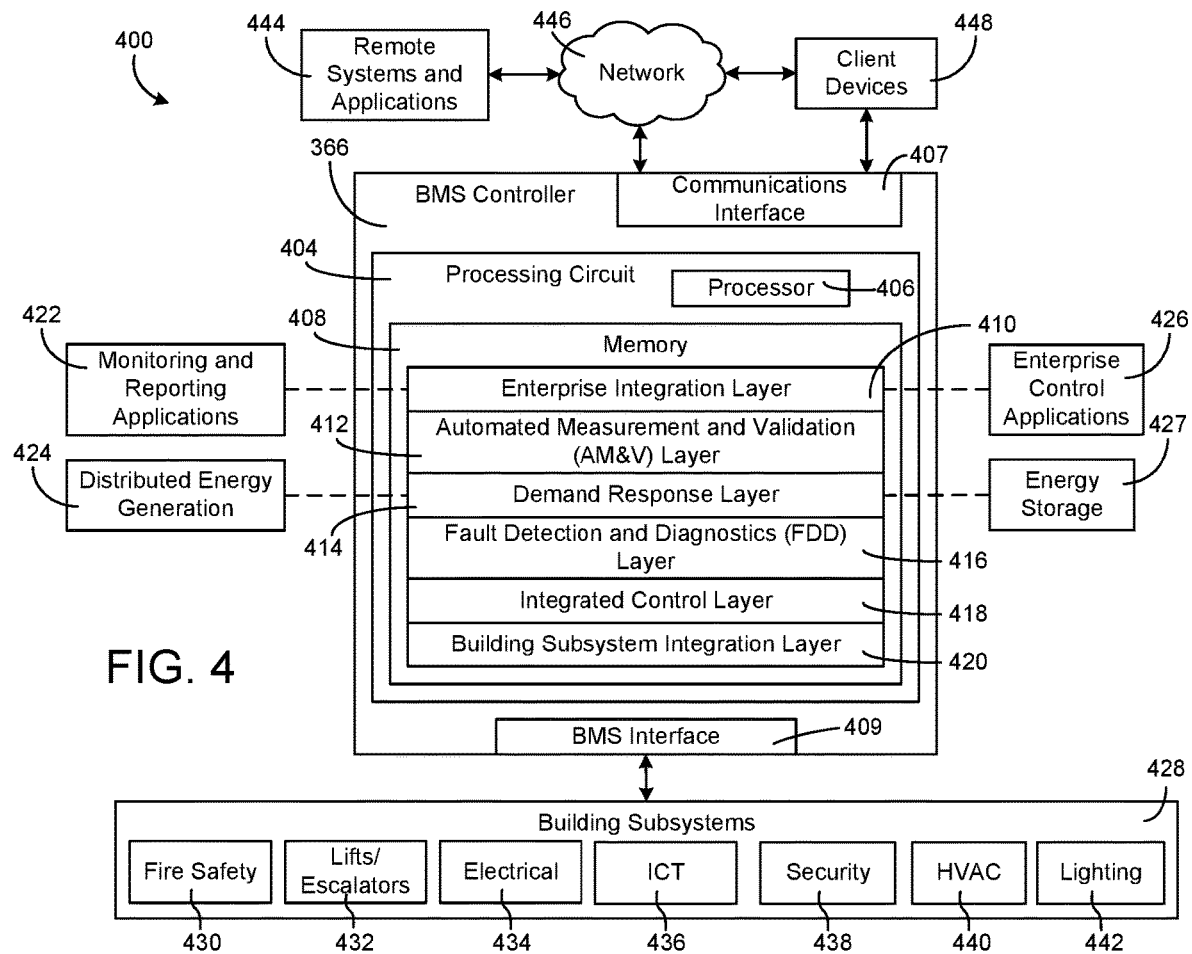
FIG. 4 is a block diagram of a building management system (BMS) which can be used to monitor and control the building of FIG. 1, according to some embodiments.
Figure 5:
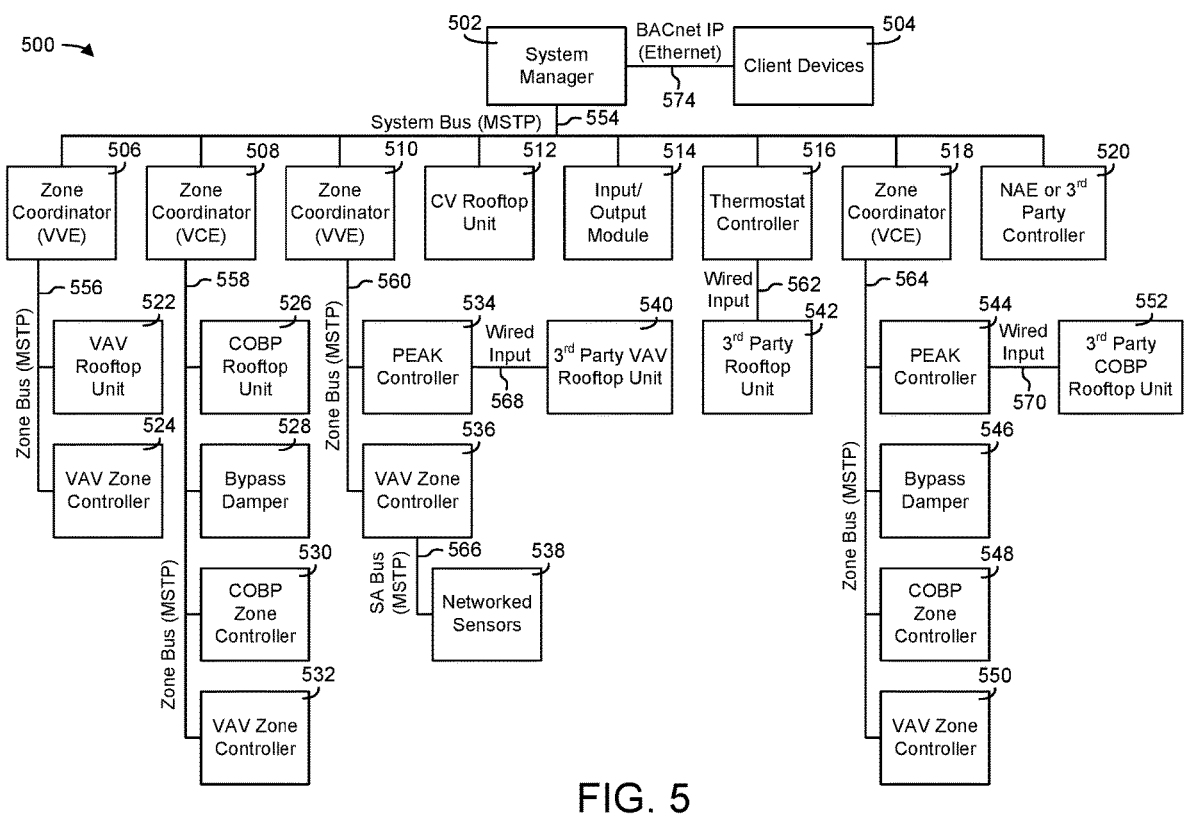
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid.

The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Automated Point Mapping Validation

Figure 6:
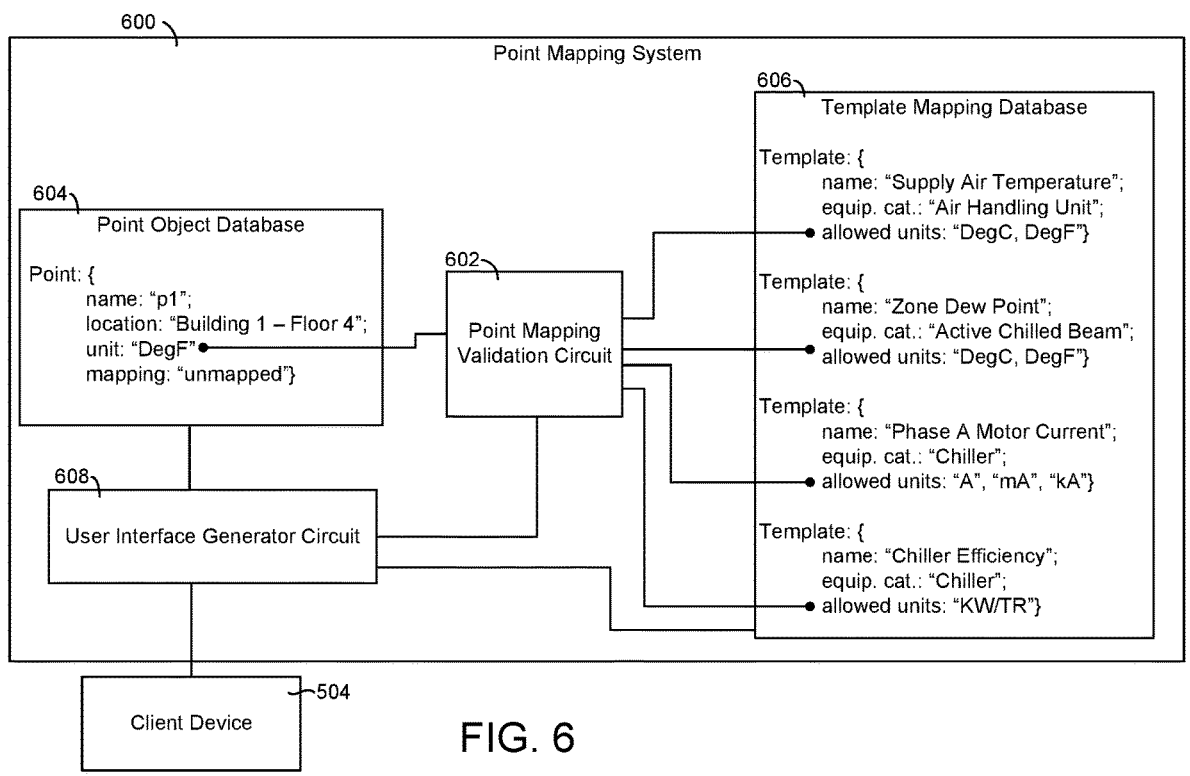
FIG. 6 is a block diagram of a point mapping system which can be used in the BMSs of FIGS. 4-5, according to some embodiments.
Figure 7:
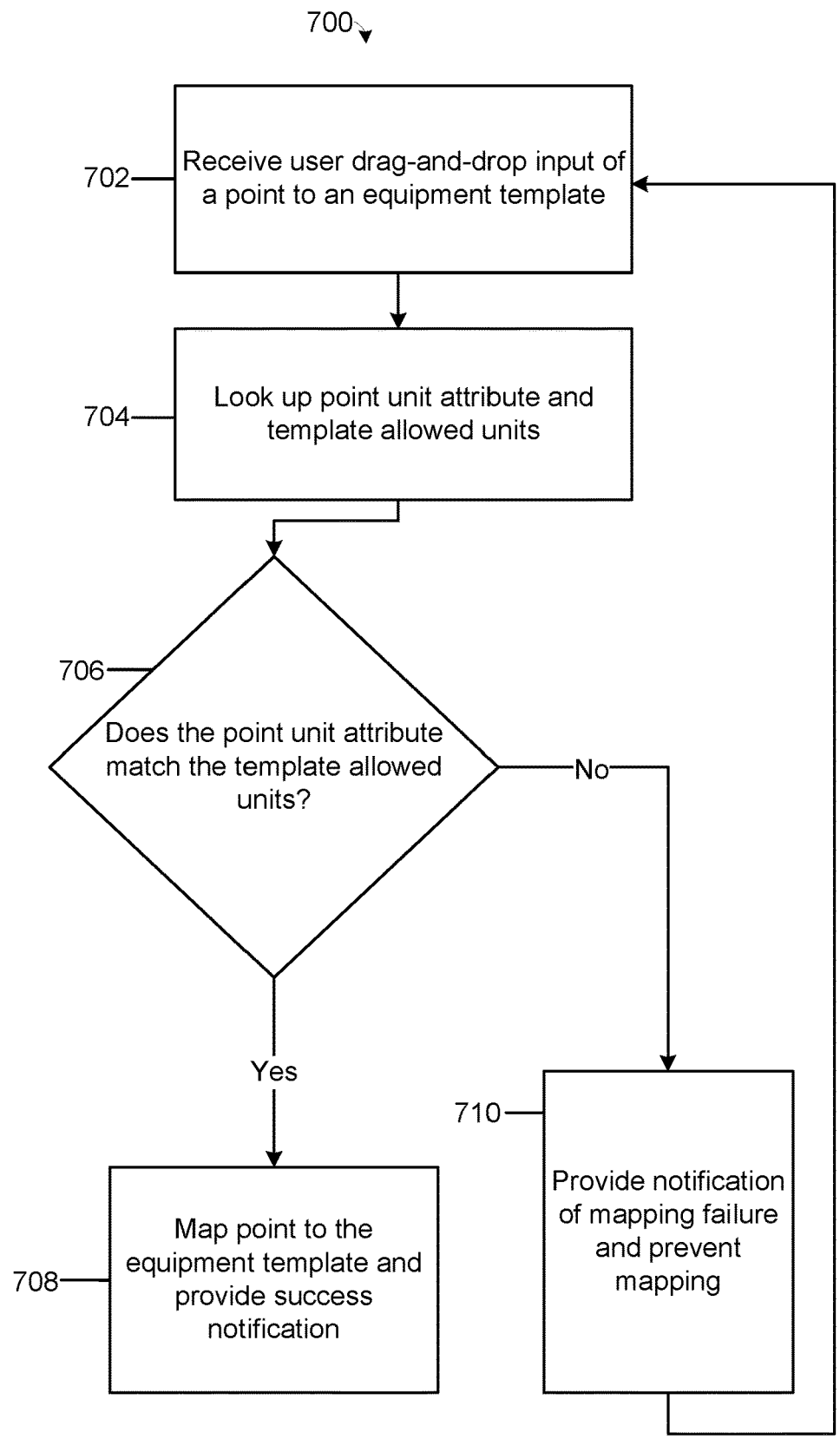
FIG. 7 is a flowchart depicting a method of automated point mapping validation which can be performed by the BMSs of FIGS. 4-5, according to some embodiments.
Figure 8:
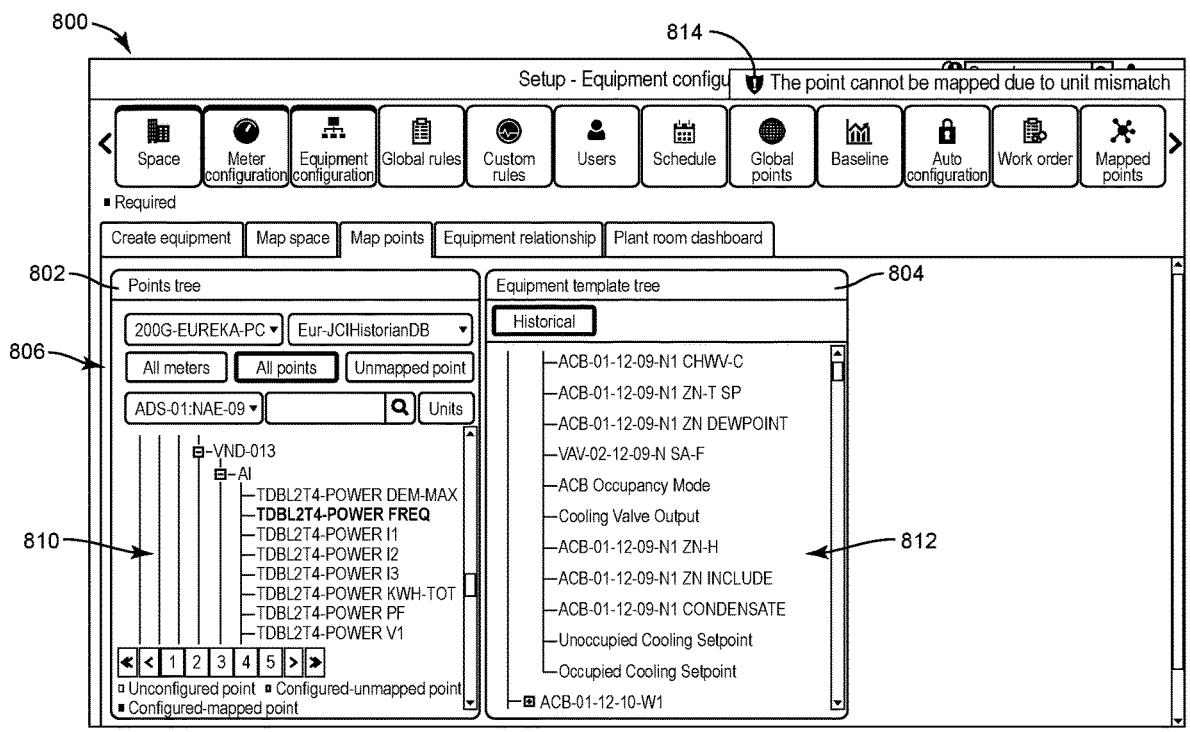
FIG. 8 is a depiction of an equipment configuration interface which can be generated by the BMSs of FIGS. 4-5, according to some embodiments.

Referring now to FIGS. 6-8, systems and methods for automated point mapping validation are shown, according to exemplary embodiments. A BMS (e.g., BMS 500 of FIG. 5, BMS 400 of FIG. 4) includes a variety of sensors, meters, and equipment that provide data relating to a building and to the operation building equipment. Each sensor, meter, or equipment provides data corresponding to one or more points. To properly process data from the sensors, a BMS may require the points to be properly mapped to the correct building equipment devices and to the correct metrics related to those devices to ensure that data corresponding to each point is used to calculate the correct metrics or performance indicators.

In some BMSs, initial mapping of points to devices and metrics is a manual process, whereby a user maps points to metrics via a user interface. As a result of the manual mapping process, mapping errors are often not discovered until metric miscalculations or error messages appear during the operational stages of the BMS. The system for automated point mapping validation described herein allows for mapping errors to be recognized and prevented immediately during the mapping process, improving the usability of the BMS, reducing the risk of errors, and improving the efficiency of set-up and installation of the BMS.

Referring now to FIG. 6, a block diagram of a point mapping system 600 is shown, according to an exemplary embodiment. In some embodiments, the point mapping system 600 is a component of a BMS, such as BMS 400 or BMS 500 as described with reference to FIGS. 4-5, for example included in system manager 502. The point mapping system 600 is shown to include a point mapping validation circuit 602, a point object database 604, a template object database 606, and a user interface generator circuit 608.

The point object database 604 can store a representation of a point as a point object (data object). The point object may include point attributes, including a name attribute, a location attribute, a unit attribute, and a mapping status. The unit attribute indicates the units of the data provided by the point, including, for the sake of non-limiting example, degrees Celsius (DegC), degrees Fahrenheit (DegF), Amps (A), Volts (V), Watts (W), kilowatts (kW), rotations per minute (RPM), miles per hour (MPH), etc. For example, if the point provides a temperature measurement, the unit attribute for the point may be "DegF."

The template object database 606 can store template objects that correspond to equipment device metrics or building management metrics to be calculated by the BMS. Each template object may have template attributes including, for example, template name, template equipment category, and allowed units. The allowed units attribute indicates the units (e.g., DegC, DegF, A, V, W, kW, RPM, MPH, etc.) that the template requires for data provided by a point to generate the corresponding metric. For example, if the template is used to generate a Supply Air Temperature, it may require a point to supply input data in degrees Fahrenheit or Celsius.

In some embodiments, the point object database 604 and the template object database 606 are stored in a system database external to the point mapping system 600 but accessible via an electronic interface. For example, the point object database 604 and the template object database 606 may also or alternatively be stored in a cloud-based datacenter.

The user interface generator circuit 608 is configured to generate a graphical user interface that allows a user to request that a point object be mapped to a template object and provide the graphical user interface to a client device 504. An example of such a graphical user interface is shown in FIG. 8 and described in detail with reference thereto. The user interface generator circuit 608 may be communicably coupled to the point object database 604 and the template object database 606 to retrieve lists of points and templates for inclusion in the graphical user interface. The user interface generator circuit 608 may also be configured to receive a request to map a point object to a template object from a user and forward the request to the point mapping validation circuit 602.

The point mapping system 600 may also include a point mapping validation circuit 602. The point mapping validation circuit 602 is configured to receive a request from the user interface generator circuit 608 to map a point object to a template object. In response, the point mapping validation circuit 602 is configured access the point object database 604 to identify the unit attribute for the requested point (i.e., the unit attribute of the point object to be mapped) and to access the template object database 606 to read the allowed units attribute for the requested template (i.e., the allowed units attribute of the template object to which the point object is to be mapped). The point mapping validation circuit 602 then determines whether the units attribute for the point matches the allowed units attribute for the template. It should be noted that the units attribute of the point may match the allowed units attribute of the template if the units attribute matches any (i.e., one or more) of the allowed units specified in the allowed units attribute of the template. If the units attribute for the point matches the allowed units attribute for the template, the point mapping validation circuit 602 may map the point object to the template object by updating a mapping attribute in the point object to reference the requested template object and transmits a success message to the user interface generator circuit 608. If the units attribute for the point does not match the allowed units attribute for the template, the point mapping validation circuit 602 may prevent the mapping and may send a rejection message to the user interface generator circuit 608.

As shown in FIG. 6, the point "p1" has a mapping attribute of "unmapped." If a user attempts to map point p1 to a selected template, the point mapping validation circuit 602 may access the point object for p1 and reads the unit attribute ("DegF"). The point mapping validation circuit 602 may store the unit attribute in temporary memory. The point mapping validation circuit 602 may also access the template object database 606 and look up the template object selected by the user. The point mapping validation circuit 602 may read the allowed units attribute of the selected template object and compare it to the unit attribute for point p1. If the unit attribute of the point object is included in the allowed units attribute (e.g., "DegF" is included in the allowed units for "Supply Air Temperature" and "Zone Dew Point"), the point mapping validation circuit validates the mapping. If the unit attribute is not included in the allowed units attribute of the selected template (e.g., if "p1" and "Chiller Efficiency" are compared), the point mapping validation circuit 602 prevents the mapping.

Thus, in the example of FIG. 6, the point mapping validation circuit 602 would validate a mapping of point p1 to templates "Supply Air Temperature" or "Zone Dew Point" due to the inclusion of the unit attribute "DegF" in the allowed units attributes "DegC, DegF" of these templates. However, the point mapping validation circuit 602 would reject a mapping to templates "Phase A Motor Current" or "Chiller Efficiency" shown in FIG. 6 because the unit attribute "DegF" is not present in the allowed units attribute for those templates. It should be understood that these examples are included for illustrative purposes and are not meant to be limiting.

Referring now to FIG. 7, a flowchart depicting a process 700 for automated point mapping validation is shown, according to an exemplary embodiment. Process 700 may be performed by the point mapping system 600 of FIG. 6 and/or various components of BMS 400 or 500.

At step 702, the point mapping system 600 receives a input from a user mapping a selected point to a selected template on a graphical user interface. For example, the user may provide the mapping via a drag-and-drop input where the user drags (e.g., click and hold) the point from a list of points and drops (e.g., releases the click) the selected point on a selected template on the graphical user interface. Such a drag-and-drop feature may allow the user to quickly and easily place the point in the template on the user interface, improving usability. An example of a graphical user interface which can be used to receive the user input in process 700 is shown in FIG. 8 and described with reference thereto.

At step 704, the point mapping system 600 looks up the unit attribute for the selected point and the allowed units attribute for the selected template (i.e., in the point object database 604 and the template object database 606). At step 706, the point mapping system 600 then determines whether the point's unit attribute is included in the template's allowed units attribute. If the point's unit attribute is included in the template's allowed units attribute (i.e., the result of step 706 is "yes"), then at step 708 the point mapping system 600 validates the mapping and the point is mapped to the template in the BMS. For example, a template attribute of the point object stored by the point object database 604 may be updated to list the selected template. At step 708, the point mapping system 600 also provides a notification of success of the mapping to the graphical user interface.

If the point's unit attribute is not included in the template's allowed units attribute (i.e., the result of step 706 is "no"), then at step 710 the point mapping system 600 prevents the point from being mapped to the template and provides a notification of mapping failure to user via the graphical user interface (i.e., via a client device 504). The user interface may display information related to the reasons for the mapping failure, and the selected point is not mapped to the selected timeline. The process then returns to step 702, wherein the point mapping system 600 receives another attempt from a user to correctly map a point to a template.

Referring now to FIG. 8, an equipment configuration interface 800 is shown, according to an exemplary embodiment. The equipment configuration interface 800 may be generated by the user interface generator circuit 608 of FIG. 6 and presented on one or more client devices 504.

The equipment configuration interface 800 includes a points tree widget 802 and an equipment template tree widget 804. The points tree widget 802 provides search tools 806 for locating a desired point, including drop down options, meter status toggle, and a text-entry search box. A units button 808 may be used to filter points by associated units. The points tree widget 802 shows a points tree 810, in which points are listed by name in a hierarchical list, organized by meter type, unit attribute, location, or other categorization. Point names on the points tree 810 may be color-coded to indicate whether the point is mapped or unmapped, and configured or not configured. The equipment template tree widget 804 shows an equipment template tree 812, which may include a list of equipment and templates organized hierarchically and listed by name, with templates shown under corresponding equipment devices. A template may be deleted from this list using a trash button.

The equipment configuration interface 800 is configured to allow a user to drag the name of a point from the points tree 810 in the points tree widget 802 and drop it on a template name in the equipment template tree 812 of the equipment template tree widget 802. The automated points mapping validation system 602 may then checks whether the point's unit matches any of the template's allowed units, as described above with reference to FIGS. 6-7, for example.

If the point's unit does not match any of the template's allowed units, an error notification is presented, shown as error notification 814, and the point is prevented from being mapped to the template. The error notification may be color-coded to indicate an error (e.g., red), may be positioned on the screen to attract the user's attention, and/or may include an audible alarm. In the example shown, the error notification 814 is positioned in an upper-right hand corner of the equipment configuration interface 800. The error notification 814 may include a brief explanation of the error, for example stating that the point cannot be mapped due to unit mismatch.

If the point's unit does match any of the template's allowed units, a notification of success may be presented. The point's entry on the list of points will be updated to indicate that the point has been mapped to the selected template, and the point mapping system 600 maps the point to the template. Then, throughout other systems and methods included with a BMS, the point may be used with the selected template to calculate and present building equipment metrics and key performance indicators. The equipment configuration interface 800 may thereby allow a user to map points to equipment templates for all points and equipment types in the BMS.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
at least one of a meter or equipment configured to provide data samples for a point;
a point mapping system configured to:
store a point object corresponding to the point and comprising a unit attribute;
store a template object corresponding to a building equipment metric and comprising an allowed units attribute;
access the point object to read the unit attribute;
access the template object to read the allowed units attribute;
in response to a request to map the point object to the template object, determine whether the unit attribute matches the allowed units attribute; and
in response to a determination that the unit attribute matches the allowed units attribute, automatically map the point object to the template object; and
a system manager configured to:
calculate the building equipment metric using the samples for the point in response to mapping the point object to the template object; and
operate building equipment using the building equipment metric to affect a variable state or condition of a building.

2. The building management system of claim 1, wherein the point mapping system is configured to prevent the mapping of the point object to the template object in response to a determination that the unit attribute does not match the allowed units attribute.

3. The building management system of claim 1, wherein mapping the point object to the template object comprises updating a mapping attribute of the point object to reference the template object.

4. The building management system of claim 1, further comprising a graphical user interface generator configured to generate a graphical user interface that allows a user to input the request to map the point object to the template object.

5. The building management system of claim 4, wherein the graphical user interface generator is configured to provide an error notification on the graphical user interface in response to a determination that the unit attribute does not match the allowed units attribute.

6. The building management system of claim 4, wherein:
the graphical user interface comprises a points tree widget comprising a list of a plurality of points and an equipment template tree widget comprising a list of a plurality of templates; and
the graphical user interface allows a user to drag the point from the list of the plurality of points onto a template in the list of the plurality of templates to input the request to map the point object to the template object.

7. The building management system of claim 1, wherein:
the allowed units attribute identifies a plurality of allowed units; and
the unit attribute identifies a first unit; and
the point mapping validation circuit is configured to determine whether the unit attribute matches the allowed units attribute by determining whether the plurality of allowed units comprise the first unit.

8. A method for managing a building comprising providing, by a meter, data samples for a point;
storing, by a point mapping system, a point object corresponding to the point, the point object comprising a unit attribute;
storing, by the point mapping system, a template object corresponding to a building equipment metric, the template object comprising an allowed units attribute;
accessing the point object to read the unit attribute;
accessing the template object to read the allowed units attribute;
in response to a request to map the point object to the template object, determining whether the unit attribute matches the allowed units attribute;
in response to a determination that the unit attribute matches the allowed units attribute, automatically mapping the point object to the template object;
calculating, by a system manager, a building equipment metric using the samples for the point in response to mapping the point object to the template object; and
operating building equipment using the building equipment metric to affect a variable state or condition of the building.

9. The method of claim 8, further comprising preventing, in response to a determination that the unit attribute does not match the allowed units attribute, a mapping of the storage the point object to the template object.

10. The method of claim 8, wherein mapping the point object to the template object comprises updating a mapping attribute of the point object to reference the template object.

11. The method of claim 8, further comprising generating a graphical user interface that allows a user to input a request to map the point object to the template object.

12. The method of claim 11, further comprising providing an error notification on the graphical user interface in response to a determination that the unit attribute does not match the allowed units attribute.

13. The method of claim 11, further comprising:
providing, on the graphical user interface, a points tree widget comprising a list of a plurality of points and an equipment template tree widget comprising a list of a plurality of templates; and
allowing, on the graphical user interface, a user to drag the point from the list of the plurality of points onto a template in the list of the plurality of templates to input the request to map the point object to the template object.

14. The method of claim 8, wherein:
the allowed units attribute identifies a plurality of allowed units; and
the unit attribute identifies a first unit; and
determining whether the unit attribute matches the allowed units attribute comprises determining whether the plurality of allowed units comprise the first unit.

15. A building management system, comprising:
building equipment operable to affect a variable state or condition of a building;
a meter configured to provide data samples for a point, the point relating to the building equipment;
a point mapping system comprising:
a point object database configured to store a point object corresponding to the point, the point object comprising a unit attribute;
a template object database configured to store a template object corresponding to a building equipment metric, the building equipment metric comprising an allowed units attribute; and a point mapping validation circuit configured to:
  receive a user request to map the point to the template;
  access the point object to read the unit attribute;
  access the template object to read the allowed units attribute;
  in response to the request to map the point to the template, determine whether the unit attribute matches the allowed units attribute; and
  in response to a determination that the unit attribute matches the allowed units attribute, automatically map the point object to the template object; and
a system manager configured to:
  calculate the building equipment metric using the samples for the point in response to mapping the point object to the template object; and
  control the building equipment using the building equipment metric to affect a variable state or condition of a building.

16. The building management system of claim 15, wherein the point mapping validation circuit is further configured to, in response to a determination that the unit attribute does not match the allowed units attribute, prevent a mapping of the point object to the template object.

17. The building management system of claim 15, further comprising a graphical user interface generator configured to generate a graphical user interface that allows a user to input the user request.

18. The building management system of claim 17, wherein the graphical user interface generator is configured to provide an error notification on the graphical user interface in response to a determination that the unit attribute does not match the allowed units attribute.

19. The building management system of claim 17, wherein:
  the graphical user interface comprises a points tree widget comprising a list of a plurality of points and an equipment template tree widget comprising a list of a plurality of templates; and
  the graphical user interface allows a user to drag the point from the list of the plurality of points onto the template in the list of the plurality of templates to input the request to map the point object to the template object.

20. The building management system of claim 15, wherein:
  the allowed units attribute identifies a plurality of allowed units; and
  the unit attribute identifies a first unit; and
  the point mapping validation circuit is configured to determine whether the unit attribute matches the allowed units attribute by determining whether the plurality of allowed units comprise the first unit.

* * * * *